US008756549B2

(12) United States Patent
Graf et al.

(10) Patent No.: US 8,756,549 B2
(45) Date of Patent: Jun. 17, 2014

(54) INTEGRATED CIRCUIT CHIP INCORPORATING EMBEDDED THERMAL RADIATORS FOR LOCALIZED, ON-DEMAND, HEATING AND A SYSTEM AND METHOD FOR DESIGNING SUCH AN INTEGRATED CIRCUIT CHIP

(75) Inventors: Richard S. Graf, Gray, ME (US); Keishi Okamoto, Kawasaki (JP); Faraydon Pakbaz, Milton, VT (US); Jack R. Smith, South Burlington, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 12/984,638

(22) Filed: Jan. 5, 2011

(65) Prior Publication Data
US 2012/0168416 A1 Jul. 5, 2012

(51) Int. Cl.
G06F 17/50 (2006.01)
G06F 9/455 (2006.01)
G06F 19/00 (2011.01)
G01R 31/02 (2006.01)
G01R 31/00 (2006.01)
G01R 31/26 (2014.01)
H03K 5/22 (2006.01)

(52) U.S. Cl.
USPC .......... 716/118; 716/110; 716/113; 716/119; 716/120; 716/132; 716/133; 716/134; 716/136; 702/132; 324/537; 324/750.06; 324/762.03; 327/83

(58) Field of Classification Search
CPC ........... G01R 31/2856; G01R 31/2874; G01R 31/2805; G06F 1/206; G06F 17/5068; G06F 17/5031; G06F 17/505; G06F 17/5036; G06F 2217/78; G06F 2217/84; H03F 220/447
USPC ......... 716/110, 113, 118, 120, 132–134, 136; 324/537, 750.06, 762.03; 702/132; 327/83
See application file for complete search history.

(56) References Cited

U.S. PATENT DOCUMENTS 6,396,706 B1 5/2002 Wohlfarth
7,180,380 B2 2/2007 Bienek et al.
(Continued)

FOREIGN PATENT DOCUMENTS

JP 04206861 A 7/1992

OTHER PUBLICATIONS

Technical Disclosure, entitled, "Inline Device Structure and Method for Evaluating Negative Bias Temperature Instability (NBTI) for Silicon-On-Insulator (SOI)", Author(s): IBM IP.com No. IPCOM000033546D, Original Publication Date: Dec. 16, 2004, IP.com Electronice Publication: Dec. 16, 2004.

(Continued)

Primary Examiner — Stacy Whitmore
(74) Attorney, Agent, or Firm — Gibb & Riley, LLC; David A. Cain, Esq.

(57) ABSTRACT

Disclosed are embodiments of an integrated circuit chip designed for reliability at low ambient temperatures. The chip substrate can be divided into zones, including at least one temperature-sensitive zone (TSZ) that contains one or more temperature-sensitive circuits. Temperature sensor(s) can be positioned in the semiconductor substrate adjacent to the TSZ. Thermal radiator(s) can be embedded in a metal wiring layer and aligned above the TSZ. The temperature sensor(s) can be operatively connected to the thermal radiator(s) and can trigger operation of the thermal radiator(s) when the temperature in the TSZ is below a predetermined threshold temperature. Additionally, an on-chip power control system can be operatively connected to the thermal radiator(s) so that operation of the thermal radiator(s) is only triggered when a circuit within the TSZ is about to be powered up. Also disclosed are associated embodiments of a system and method for designing such an integrated circuit chip.

14 Claims, 8 Drawing Sheets

(56) References Cited

U.S. PATENT DOCUMENTS

| | | |
|---|---|---|
| 7,199,597 B2 | 4/2007 | Tustaniwskyj et al. |
| 7,483,806 B1 | 1/2009 | Arsovski et al. |
| 7,716,007 B2 | 5/2010 | Arsovski et al. |
| 7,741,816 B2 | 6/2010 | Kelty et al. |
| 2008/0054926 A1* | 3/2008 | Lopez et al. .......... 324/760 |
| 2008/0092554 A1* | 4/2008 | Okamoto et al. .......... 62/3.7 |
| 2009/0021085 A1 | 1/2009 | Arsovski et al. |
| 2009/0077508 A1* | 3/2009 | Rubin et al. .......... 716/4 |
| 2009/0177445 A1* | 7/2009 | Capps et al. .......... 703/1 |
| 2009/0295457 A1 | 12/2009 | Mowry et al. |
| 2010/0007367 A1 | 1/2010 | Spielberger et al. |

OTHER PUBLICATIONS

Wang et al., "Temperature-Constrained Power Control for Chip Multiprocessors with Online Model Estimation," Department of Electrical Engineering and Computer Science, 11 pages, Jun. 2009.

Meijer et al., "On-Chip Digital Power Supply Control for System-on-Chip Applications," ISLPED, Aug. 2005, pp. 311-314.

E. Flinn, "Microscopic radiators fly on satellites 'skin'," Aerospace America, pp. 24-25, Aug. 2006.

Gaitan et al, "Commercial CMOS Foundry Thermal Display for Dynamic Thermal Scene Simulation," SPIE vol. 1969, pp. 363-369, Aug. 1993.

Iwaki et al, "Design and simulation of resistive SOI CMOS microheaters for high temperature gas sensors," IOP Publishing Ltd, pp. 27-32, 2005.

Khounsary et al., "Thermal contact resistance across a copper-silicon interface," Advanced Photon Source, Oct. 1997.

Wunsch et al., "Evaluation of Coaxial Single Range Thermal Voltage Converters with Multijunction Thin-Film Thermoelements," IEEE Instrumentation and Measurement Technology Conference, 4 pages, May 2001.

Parameswaran et al., "Micromachined Thermal Radiation Emitter from a Commercial CMOS Process," IEEE Electron Device Letters, vol. 12, No. 2, Feb. 1991, pp. 57-59.

Okamoto et al., "Thermal Modeling," IBM Corporation, 2010.

Viswanath et al., "Thermal Performance Challenges from Silicon to Systems," Intel Technology Journal Q3, 2000, pp. 1-16.

Bertone et al, "Noise and Stability in PIN Detectors," PerkinElmer, 1998-2003.

\* cited by examiner

INTEGRATED CIRCUIT CHIP INCORPORATING EMBEDDED THERMAL RADIATORS FOR LOCALIZED, ON-DEMAND, HEATING AND A SYSTEM AND METHOD FOR DESIGNING SUCH AN INTEGRATED CIRCUIT CHIP

BACKGROUND

1. Field of the Invention

The present invention relates to integrated circuit chips, and more specifically, to temperature control of integrated circuit chips particularly in low-temperature environments.

2. Description of the Related Art

Customers and, particularly, military and/or government customers often require integrated circuit chips to be operable at a specified very low ambient temperature (e.g., an ambient temperature of 0° C., −20° C., −55° C., −75° C., etc.). Many integrated circuit chips or components thereof are either non-functional or fail to meet specific performance requirements (i.e., fail to meet specific timing requirements) at very low temperatures. Unfortunately, circuits and/or circuit components designed to be functional and to meet specific performance requirements (i.e., timing requirements) at very low temperatures can be costly.

SUMMARY

Disclosed herein are embodiments of an integrated circuit chip designed for reliability at low ambient temperatures. The integrated circuit chip can comprise a semiconductor substrate and a plurality of circuits on that substrate. The integrated circuit chip can further comprise metal wiring layers on the substrate above the circuits. At least one thermal radiator can be positioned in one of the metal wiring layers such that it is aligned above a temperature-sensitive zone (TSZ) within the substrate. Such a TSZ can comprise at least one temperature-sensitive circuit (i.e., a circuit that, at a specified low temperature, is known to be non-functional or known to be unable to meet performance specifications). Additionally, at least one temperature sensor can be positioned on the substrate adjacent to the TSZ (i.e., on the perimeter of the TSZ). This temperature sensor can sense the temperature of the TSZ and can be operatively connected to the thermal radiator so as to automatically trigger operation of the thermal radiator when the temperature, as sensed, is a below a predetermined threshold temperature. An on-chip power control system, which is capable of selectively controlling powering up and down of individual circuits on the integrated circuit chip, can also be operatively connected to the thermal radiator so that automatic triggering of thermal radiator operation only occurs immediately prior to powering up of any circuit within the TSZ.

Also disclosed herein are embodiments of a system for designing such an integrated circuit chip. The system embodiments can comprise at least a timing analysis tool, a mapping tool and a design-for-reliability tool. The timing analysis tool can perform, based on an initial design for the integrated circuit chip, a timing analysis of the integrated circuit chip at a specified low temperature in order to identify any temperature-sensitive circuits within the integrated circuit chip. That is, the timing analysis is performed to identify circuits that are non-functional or unable to meet performance specifications at the specified low temperature. The mapping tool can be in communication with the timing analysis tool and can generate, based on the results of the timing analysis, a map that identifies at least one temperature-sensitive zone (TSZ) on the integrated circuit chip. Such a TSZ can comprise at least one temperature-sensitive circuit. The design-for-reliability tool can be in communication with the mapping tool and can insert, based on the map, at least one thermal radiator into the layout of the integrated circuit chip such that the thermal radiator is in a metal wiring layer and aligned above the TSZ. Additionally, the design-for-reliability tool can insert, again based on the map, at least one temperature sensor into the layout such that the temperature sensor is positioned adjacent to the perimeter of the TSZ, such that the temperature sensor senses the temperature of the TSZ and such that the temperature sensor is operatively connected to the thermal radiator in order to automatically trigger operation of the thermal radiator when the temperature is a below a predetermined threshold temperature. It should be noted that, if the initial design for the integrated circuit chip also includes an on-chip power control system capable of selectively controlling powering up and down of individual circuits, then the design-for-reliability tool can further insert the thermal radiator into the layout such it is operatively controlled by the on-chip power control system and, specifically, such that its operation will only be automatically triggered immediately prior to powering up of any circuit within the TSZ.

Also disclosed herein are embodiments of a computer-implemented method for designing such an integrated circuit chip. The method embodiments can comprise performing, based on an initial design of the integrated circuit chip, a timing analysis at a specified low temperature in order to identify any temperature-sensitive circuits within the integrated circuit chip. That is, the timing analysis tool can perform the timing analysis in order to identify circuits that are non-functional or unable to meet performance specifications at the specified low temperature. Next, based on the results of the timing analysis, a map can be generated that identifies at least one temperature-sensitive zone (TSZ) on the integrated circuit chip. Such a TSZ can comprise at least one temperature-sensitive circuit. Then, based on this map, at least one thermal radiator can be inserted into the layout of the integrated circuit chip such that the thermal radiator is in a metal wiring layer and aligned above the temperature-sensitive zone. Also, based on this map, at least one temperature sensor can be inserted into the layout such that the temperature sensor is positioned adjacent to the perimeter of the TSZ, such that the temperature sensor senses the temperature of the TSZ and such that the temperature sensor is operatively connected to the thermal radiator in order to automatically trigger operation of the thermal radiator when the temperature is a below a predetermined threshold temperature. It should be noted that, if the initial design for the integrated circuit chip also includes an on-chip power control system capable of selectively controlling powering up and down of individual circuits, then the process of inserting the thermal radiator into the layout can further be performed so that the thermal radiator is operatively controlled by the on-chip power control system and, specifically, such that its operation will only be automatically triggered immediately prior to powering up of any circuit within the TSZ. The above-described method steps can be performed, for example, by any one or more components of a computer system.

BRIEF DESCRIPTION OF THE SEVERAL VIEWS OF THE DRAWINGS

The embodiments disclosed herein will be better understood from the following detailed description with reference to the drawings, which are not necessarily drawn to scale and in which.

DETAILED DESCRIPTION

The embodiments of the invention and the various features and advantageous details thereof are explained more fully with reference to the non-limiting embodiments that are illustrated in the accompanying drawings and detailed in the following description.

Customers and, particularly, military and/or government customers often require integrated circuit chips to be operable at a specified very low ambient temperature (e.g., an ambient temperature of 0° C., −20° C., −55° C., −75° C., etc.). Many integrated circuit chips or components thereof are either non-functional or fail to meet specific performance requirements (i.e., fail to meet specific timing requirements) at very low temperatures. Unfortunately, circuits and/or circuit components designed to be functional and to meet specific performance requirements at very low temperatures can be costly. One solution is to use external heaters to raise the ambient temperature. However, such external heaters can also be costly and can consume a significant amount of module space.

In view of the foregoing disclosed herein are embodiments of an integrated circuit chip designed for reliability at low ambient temperatures. Specifically, the semiconductor substrate of the integrated circuit chip can be divided into zones, including at least one temperature-sensitive zone (TSZ) that comprises one or more temperature-sensitive circuits (i.e., circuits that, at a specified low temperature, are known to be non-functional or known to be unable to meet performance specifications). Temperature sensor(s) can be positioned in the semiconductor substrate adjacent to the TSZ. Thermal radiator(s) can be embedded in a metal wiring layer and aligned above the TSZ. The temperature sensor(s) can be operatively connected to the thermal radiator(s) in order to trigger operation of the thermal radiator(s) when the temperature in the TSZ is below a predetermined threshold temperature. Additionally, an on-chip power control system can be operatively connected to the thermal radiator(s) so that operation of the thermal radiator(s) is only triggered when a circuit within the TSZ is about to be powered up. Also disclosed herein are associated embodiments of a system and method for designing such an integrated circuit chip.

Figure 1:
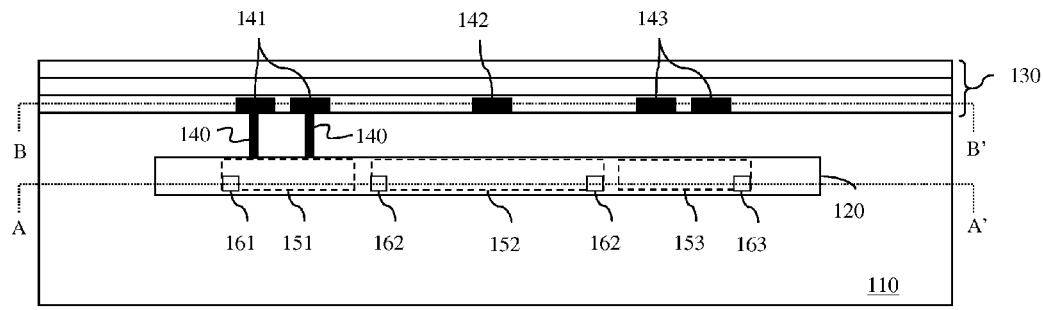
FIG. 1 is a vertical cross-section diagram illustrating an embodiment of an integrated circuit chip with embedded thermal radiators for reliability at low ambient temperatures.
Figure 2:
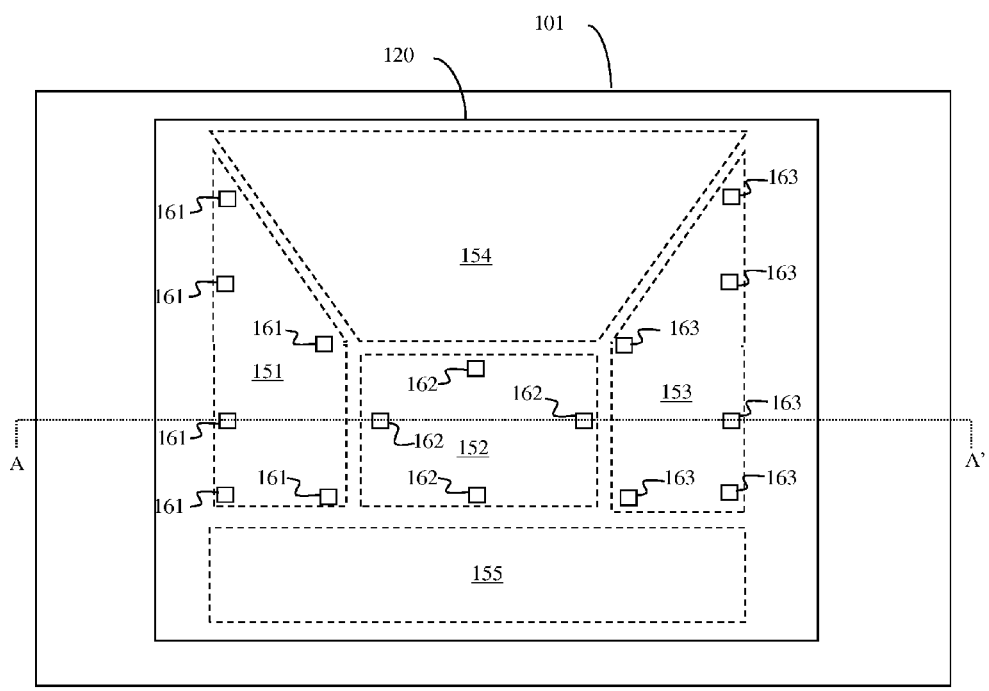
FIG. 2 is a cross-section diagram of the same integrated circuit chip through horizontal plane A-A', as shown in FIG. 1, that cuts through the chip substrate.
Figure 3:
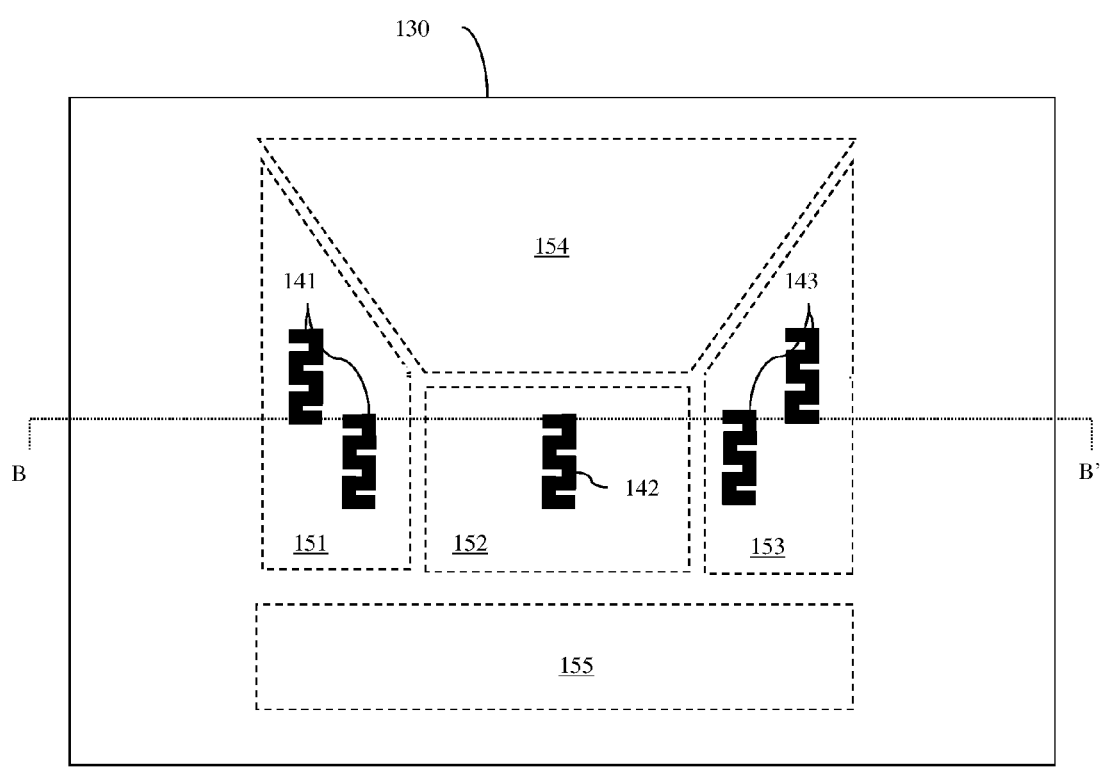
FIG. 3 is a cross-section diagram of the same integrated circuit chip through horizontal plane B-B', as shown in FIG. 1, that cuts through a metal wiring layer.

More particularly, disclosed herein are embodiments of an integrated circuit chip designed for reliability at low ambient temperatures. FIGS. 1-3 illustrate such an integrated circuit chip 100. Specifically, FIG. 1 is a cross-section illustration of the integrated circuit chip 100 through a vertical plane that cuts across the middle of the chip. FIG. 2 is a cross-section illustration of the same integrated circuit chip 100 through a horizontal plane that cuts across the chip substrate (i.e., through horizontal plane A-A' as shown in FIG. 1). FIG. 3 is a cross-section illustration of the same integrated circuit chip 100 through another horizontal plane that cuts across a metal wiring layer (i.e., through horizontal plane B-B' as shown in FIG. 1).

Referring to FIG. 1, the integrated circuit chip 100 can comprise a semiconductor substrate 110 and a plurality of circuit 120 on that substrate 110. Specifically, the semiconductor substrate 110 can comprise, for example, a bulk semiconductor substrate, a semiconductor-on-insulator (SOI) substrate, a hybrid orientation (HOT) semiconductor substrate or any other suitable semiconductor substrate. The plurality of circuits 120 can comprise any type of circuits suitable for incorporation into an integrated circuit chip (e.g., digital circuits and/or analog circuits).

Additionally, referring to FIG. 2 in combination with FIG. 1, the semiconductor substrate 110 can be virtually divided (i.e., in effect but not in fact) into multiple zones based on the temperature-sensitivity of the circuits within those zones and, particularly, based on the sensitivity of the circuits within the zones to relatively low ambient temperatures. For example, the portion of the semiconductor substrate 110 containing the plurality of circuits 120 can be divided into five discrete zones 151-155. Zones 151, 152, 153 can be designated as temperature-sensitive zones (TSZs). Each TSZ 151, 152, 153 can comprise at least one temperature-sensitive circuit. That is, each TSZ can comprise a circuit that, at a specified low temperature, is known to be non-functional or known to be unable to (i.e., fail to) consistently meet performance specifications (i.e., to known to be unable to consistently meet timing requirements). This specified low temperature can, for example, be a customer specified low temperature (e.g., 0° C., −20° C., −55° C., −75° C., etc.). It should be noted that the specified low temperature may differ between TSZs. For example, TSZ 151 may contain circuits that fail below a first specified low temperature (e.g., −55° C.) but are functional and meet timing requirements at higher temperatures, TSZ 152 may contain circuits that fail below a second specified low temperature (e.g., −20° C.) but are functional and meet timing requirements at higher temperatures, TSZ 153 may contain circuits that fail below a third specified low temperature (e.g., 0° C.) but are functional and meet timing requirements at higher temperatures, etc.

Additional zones 154 and 155 can comprise circuits that are functional and capable of consistently meeting performance requirements (i.e., meeting timing requirements) at the specified low temperatures. FIG. 2 and the description provided above are offered for illustration purposes only and are not intended to be limiting. For example, the overall number of zones and the number of TSZs shown in FIG. 2 and described above are five and three, respectively. However, these numbers are determined based on a map generated following a timing analysis performed at the specified low temperature, as discussed in greater detail below with regard to the system and method embodiments. Thus, it should be understood that the substrate 110 can be virtually divided into any number of two or more total zones and any number of one or more TSZs.

Referring again to FIG. 1, the integrated circuit chip 100 can further comprise metal wiring layers 130 on the substrate above the circuits 120. These metal wiring layers 130 can comprise a plurality of metal wires interconnecting the circuits 120 and/or the various components within the circuits. Additionally, one or more thermal radiators 141-143 can be positioned in one or more of the metal wiring layers 130. Specifically, for each TSZ 151, 152, 153, at least one thermal radiator 141, 142, 143 can be positioned within a metal wiring layer 130 such that it is aligned above that TSZ 151, 152, 153.

For example, referring to FIG. 3 in combination with FIG. 1, two first thermal radiators 141 can be within a metal wiring layer 130 aligned above a first TSZ 151. Additionally, a single second thermal radiator 142 can be within a metal wiring layer 130 aligned above a second TSZ 152 and two third thermal radiators 143 can be within a metal wiring layer 130 aligned above a third TSZ 153. Optionally, any one or more of the thermal radiators 141-143 can further comprise one or more conductive vias 140 that extend vertically from the metal wiring layer 130 towards a corresponding TSZ below. Such conductive vias 140 can drive heat towards the TSZ and, thereby enhance the localized TSZ heating provided by the thermal radiators.

For illustration purposes, FIG. 1 shows all of the thermal radiators 141-143 that are aligned above all of the TSZs 151-153 in the same metal wiring layer 130. However, it should be understood that these thermal radiators 141, 142, 143 may alternatively be positioned in multiple different metal wiring layers (e.g., as a function of space constraints). Furthermore, for illustration purposes, FIGS. 1 and 3, show only one or two thermal radiators within each TSZ. However, it should be understood that the number of thermal radiators will vary depending upon the area of the TSZ, the size of the thermal radiators, the amount of heat produced by the thermal heaters (i.e., the Joules per area energy) and the corresponding heat that reaches the TSZ, etc.

One exemplary thermal radiator that can be incorporated into the integrated circuit chip 100, as described above, is illustrated in FIG. 4. This thermal radiator 400 can comprise metal wire (e.g., a copper wire) that is folded (e.g., in a snake pattern, as shown). This folded metal thermal radiator 400 can, for example, have the following dimensions: a wire height 401 of 0.4 µm, a wire width 402 of 0.25 µm, an overall wire length of 12600 µm and 125 folds in the wire with each folded section of wire having a length 403 of 100 µm and being spaced apart from an adjacent section of folded wire by a distance 405 of 0.4 µm so that the combined width 404 of all folded sections stacked is 100 µm. Thus, the thermal radiator 400 in this example can be contained within a 100 µm by 100 µm area of the metal wiring layer. Additionally, the gap between multiple radiators in this example can be 0.3 m. A voltage applied to such a thermal radiator can generate a calculable number of Joules per area of energy and, thereby a calculable thermal load (i.e., heating effect) on the TSZ below.

For example, with such a thermal radiator configuration, the following formulas can be applied, where R=Resistance, I=Current, $R_{dc}$=DC resistance, ρ="Electrical Resistivity" or "specific electrical resistance", f=Frequency of the interest, $f_{skin}$=skin frequency, $R_{ac}$=AC resistance, which is varied based on the frequency of operation, and α=thermal coefficient:

$$\text{Power} = RI^2 \Longrightarrow 0.005 = 2.2e - 3I^2 \Longrightarrow \boxed{I \cong 1.35A}.$$

At 25° C., $$R_{dc} = \frac{\rho}{A} \times \text{length} = \frac{1.76 \times 10^{-8}}{0.4 \times 0.25} \times 12600 \cong 2.2 \ m\Omega$$

However, at a higher temperature, $R_m=1+(\alpha \Delta t)$, where α=0.0043 for copper, $\Delta t = t_2 - 25$ and $R_{dc}$ at $t_2 = R_{dc} \times R_m$. Finally, for alternating current (AC) resistance, $$R_{ac} = R_{dc} \times \frac{\sqrt{f}}{f_{skin}}$$

The thermal radiator 400, as described above and shown in FIG. 4, is offered for illustration purposes only and is not intended to be limiting. Any other suitable on-chip thermal radiator structure, which is capable of generating a calculable number of Joules per area of energy in response to an applied voltage and, thereby a calculable thermal load (i.e., heating effect) on the TSZ below, could alternatively be incorporated into the integrated circuit chip 100 of the present invention.

Additionally, for each TSZ 151, 152, 153, one or more temperature sensors 161, 162, 163 can be positioned on the substrate 110 around the perimeter of the TSZ. Specifically, for each TSZ 151, 152, 153, at least one temperature sensor 161, 162, 163, respectively, can be positioned within the substrate 110 adjacent to that TSZ, can sense the temperature of that TSZ, and can be operatively connected to the thermal radiator(s) 141, 142, 143 aligned above that TSZ so as to automatically trigger operation of those thermal radiator(s) when the temperature, as sensed, is a below a predetermined threshold temperature.

For example, referring to again to FIG. 2 in combination with FIG. 1, six first temperature sensors 161 can be within the substrate 110 approximately evenly distributed around the perimeter of the first TSZ 151, can sense the temperature of the first TSZ 151 and can be operatively connected to the first thermal radiators 141 aligned above the first TSZ 151 so as to automatically trigger operation of the first thermal radiators 141 when the temperature, as sensed, is a below a predetermined threshold temperature. Similarly, four second temperature sensors 162 can be within the substrate 110 approximately evenly distributed around the perimeter of the second TSZ 152, can sense the temperature of the second TSZ 152 and can be operatively connected to the second thermal radiator 142 aligned above the second TSZ 152 so as to automatically trigger operation of the second thermal radiator 142 when the temperature, as sensed, is a below a predetermined threshold temperature. Finally, six third temperature sensors 163 can be within the substrate 110 approximately evenly distributed around the third TSZ 153, can sense the temperature of the third TSZ 153 and can be operatively connected to the third thermal radiators 143 aligned above the third TSZ 153 so as to automatically trigger operation of the third thermal radiators 143 when the temperature, as sensed, is a below a predetermined threshold temperature.

Figure 5:
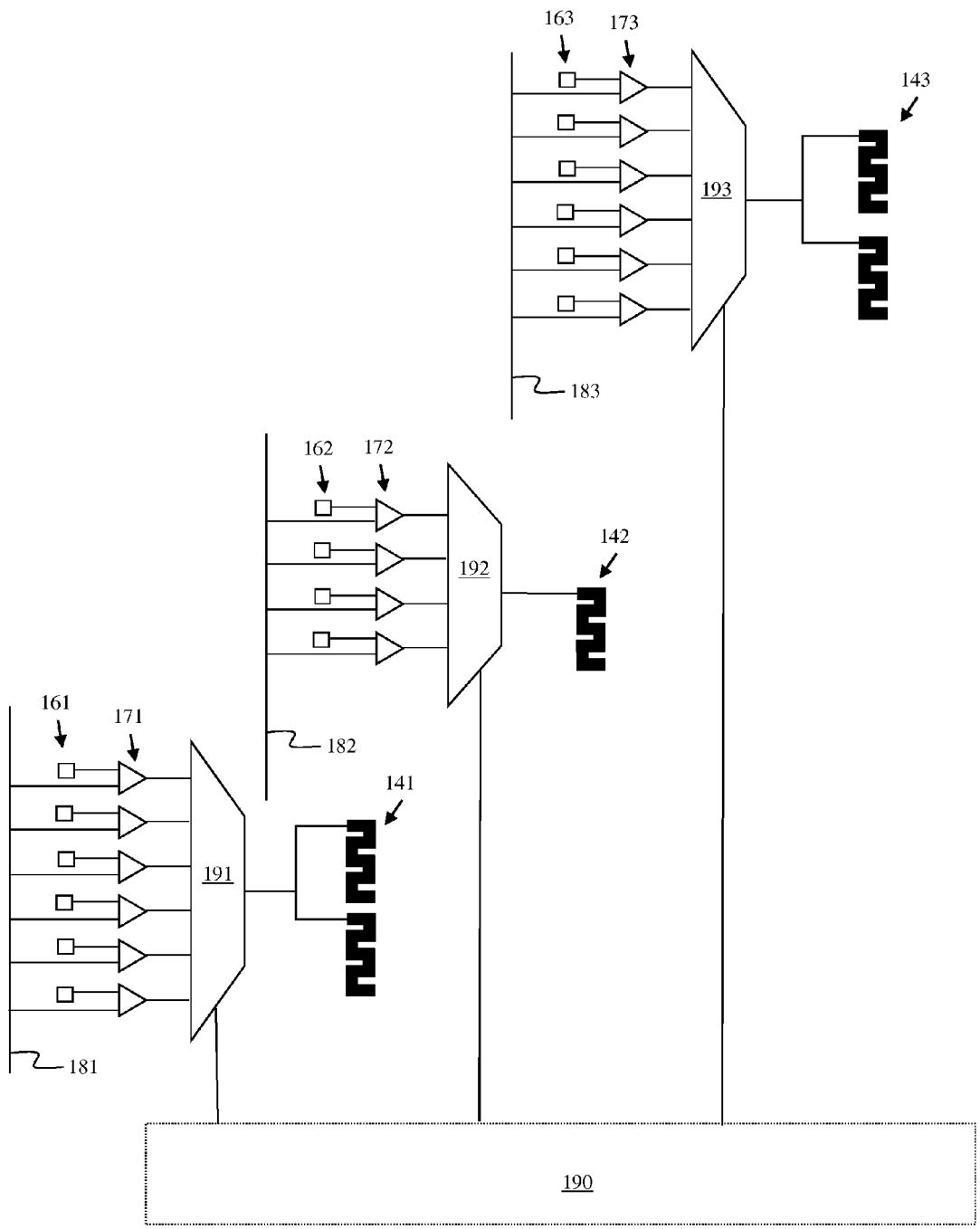
FIG. 5 is a schematic diagram illustrating a control system for operating the thermal radiators on the integrated circuit chip of FIG. 1.

More specifically, referring to FIG. 5 in combination with FIG. 2, each first temperature sensor 161 can each be electrically connected in series with a corresponding first sense amplifier 171, a first multiplexor 191 and the first thermal radiators 141. Each first sense amplifier 171 can receive inputs signals from a first temperature sensor 161 and a reference signal source 181 so that its output signal is indicative of whether or not the temperature sensed by that first temperature sensor 161 is below the predetermined threshold voltage. The first multiplexor 191 can receive output signals from all of the first sense amplifiers 171 and can send (i.e., can be configured to send or transmit, adapted to send or transmit, etc.) a signal to the first thermal radiators 141 so as to automatically trigger operation of the first thermal radiators 141 when the temperature, as sensed by a specified number of the first temperature sensors 161 (e.g., all the first temperatures sensors, half the first temperature sensors, any one of the first temperature sensors, etc.), is a below the predetermined threshold temperature. Similarly, each second temperature sensor 162 can be electrically connected in series with a corresponding second sense amplifier 172, a second multiplexor 192 and the second thermal radiator 142. Each second sense amplifier 172 can receive input signals from a second temperature sensor 162 and a reference signal source 182 so that its output signal is indicative of whether or not the temperature sensed by that second temperature sensor 162 is below the predetermined threshold voltage. The second multiplexor 192 can receive output signals from all of the second sense amplifiers 172 and can send (i.e., can be configured to send or transmit, adapted to send or transmit etc.) a signal to the second thermal radiator 142 so as to automatically trigger operation of the second thermal radiator 142 when the temperature, as sensed by a specified number of the second temperature sensors 162 (e.g., all the second temperatures sensors, half the second temperature sensors, any one of the second temperature sensors, etc.), is a below the predetermined threshold temperature. Finally, each third temperature sensor 163 can each be electrically connected in series with a corresponding third sense amplifier 173, a third multiplexor 193 and the third thermal radiators 143. Each third sense amplifier 173 can receive input signals from a third temperature sensor 163 and a reference signal source 183 so that its output signal is indicative of whether or not the temperature sensed by that third temperature sensor 163 is below the predetermined threshold voltage. The third multiplexor 193 can receive output signals from all of the third sense amplifiers 173 and can send (i.e., can be configured to send or transmit, adapted to send or transmit, etc.) a signal to the third thermal radiators 143 so as to automatically trigger operation of the thermal radiators 143 when the temperature, as sensed by a specified number of the third temperature sensors 163 (e.g., all the third temperatures sensors, half the third temperature sensors, any one of the third temperature sensors, etc.), is a below the predetermined threshold temperature.

It should be noted that the predetermined threshold temperature for the each TSZ 151, 152, 153 may be the same predetermined temperature threshold (e.g., 0° C., −20° C., −55° C., −75° C., etc.). Alternatively, the predetermined threshold temperatures for the different TSZs 151, 152, 153 may be different so as to correspond to different specified low temperatures used in establishing the TSZs. For example, the predetermined threshold temperature for a given TSZ may be equal to or slightly lower than (e.g., within a few degrees of) the specified low temperature used to establish that TSZ. It should further be understood that any of multiple different types of temperature sensors can be incorporated into the integrated circuit structure 100. Temperature sensors are well-known in the art and, thus, the details such sensors are omitted from this specification in order to allow the reader to focus on the salient aspects of the invention.

Optionally, in addition to the features described above, the integrated circuit chip 100 of can further comprise a power control system 190 (i.e., a power bussing system) (see FIG. 5) on the semiconductor substrate. This power control system 190 can selectively control (i.e., can be adapted to selectively control, configured to selectively control, etc.) powering up and down of different circuits on the substrate 110. Such on-chip power control systems 190 are typically used to limit power to circuits that are not in use in order to minimize overall power consumption. Various on-chip power control systems 190 are well-known in the art and, thus, the details of such systems 190 are omitted from this specification to allow the reader to focus on the salient aspects of the invention. If the integrated circuit chip 100 does incorporate such an on-chip power control system 190, the system 190 can further being operatively connected to each multiplexor 191, 192, 193 such that the operation of the corresponding thermal radiators 141, 142, 143 is further only automatically triggered immediately prior to powering up of any circuit that is within the corresponding TSZ 151, 152, 153. That is, power control system 190 can be electrically connected to each multiplexor 191, 192, 193 and can selectively output (i.e., can be adapted to selectively output, configured to selectively output, etc.) enable signals to these multiplexors 191, 192, 193 just prior to (e.g., within a second of, within a half-second of, etc.) powering up circuits within the corresponding TSZs 151, 152, 153. Each multiplexor 191, 192, 193 can send (i.e., can be adapted to send or transmit, can be configured to send or transmit, etc.) an output signal to the corresponding thermal radiator(s) 141, 142, 143 only upon receipt of an enable signal from the power control system 190, thereby ensuring that the thermal radiators are only operated when it is necessary.

An integrated circuit chip 100, as described above, can be formed and distributed by the fabricator in raw wafer form (that is, as a single wafer that has multiple unpackaged chips), as a bare die, or in a packaged form. In the latter case the chip can be mounted in a single chip package (such as a plastic carrier, with leads that are affixed to a motherboard or other higher level carrier) or in a multichip package (such as a ceramic carrier that has either or both surface interconnections or buried interconnections). In any case the chip can then be integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Figure 6:
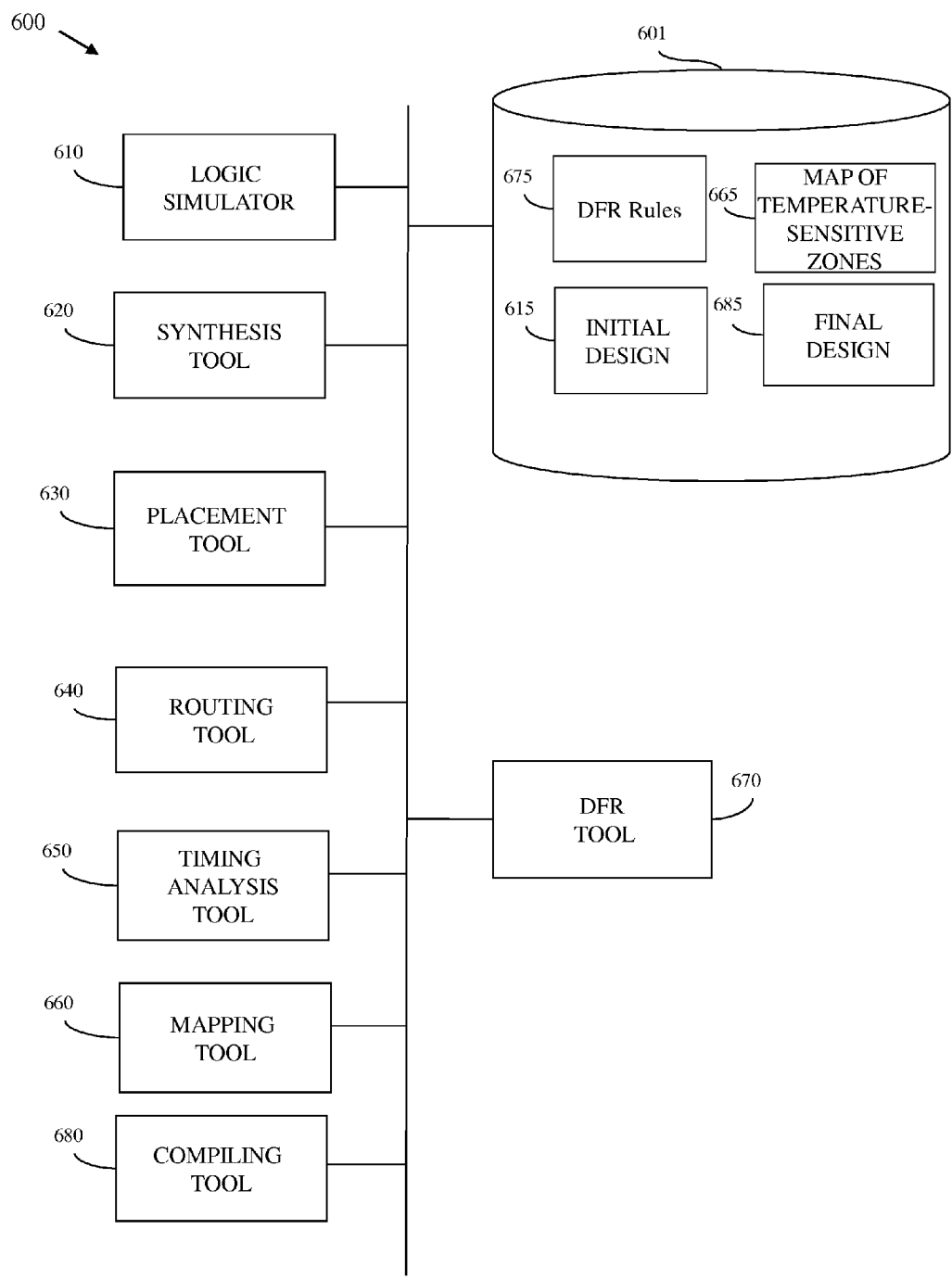
FIG. 6 is a block diagram illustrating an embodiment of system for designing an integrated circuit chip with embedded thermal radiators for reliability at low ambient temperatures.

Referring to FIG. 6, also disclosed herein are embodiments of a system 600 for designing an integrated circuit chip, as described above and illustrated in FIGS. 1-3. Specifically, the system 600 can comprise a data storage device 601 that stores (i.e., that is adapted to store, configured to store, etc.) an initial design 615 for the integrated circuit chip 100. This initial design 615 can comprise a high-level description, which sets out the requirements for the integrated circuit chip in a hardware description language (HDL) (e.g., VHDL or Verilog).

The system 600 can further comprise a logic simulator 610 and a logic synthesis tool 620. The logic simulator 610 can perform (i.e., can be adapted to perform, configured to perform, etc.) logic simulation of the high-level description in order to verify the design logic. The logic synthesis tool 620 can synthesize (i.e., can be adapted to synthesize, configured to synthesize, etc.) a low-level description (e.g., a netlist) for the integrated circuit chip from the high-level description.

The system 600 can further comprise a placement tool 630 and a routing tool 640. The placement tool 630 can convert (i.e., can be adapted to convert, configured to convert, etc.) the low-level description of the integrated circuit chip (e.g., the netlist) into a layout for the integrated circuit chip. Specifically, this placement tool 630 can establish placement of devices on the chip or, more particularly, placement of groups of interconnected devices (i.e., cells or blocks) as set forth in the second-level description. Layout versus schematic (LVS) checking techniques can be used to associate specific polygons in the layout with the untested and tested nodes and can tag them accordingly in the layout (e.g., with a special code). The routing tool 640 can then establish (i.e., can be adapted to establish, configured to establish, etc.) a detailed routing for the integrated circuit chip based on the layout, as generated by the placement tool 630. Specifically, the routing tool 640 can establish wiring routes in the metal wiring layers for interconnecting the circuits on the chip and for interconnecting devices within the circuits. It should be noted that the placement tool 630 and the routing tool 640 can leave space (i.e., can be adapted to leave space, configured to leave space, etc.) in the semiconductor substrate and the metal wiring layers for subsequent insertion of temperature sensors and thermal radiators, respectively, as discussed in greater detail below.

The system 600 can further comprise a timing analysis tool 650, a mapping tool 660 and a design-for-reliability tool 670.

The timing analysis tool 650 can perform (i.e., can be adapted to perform, configured to perform, etc.) a timing analysis of the integrated circuit chip, based on the initial design 615 and, more particularly, based on the layout and wiring routing for the initial design 615, as generated by the placement tool 630 and routing tool 640. The timing analysis tool 650 can specifically perform the timing analysis at one or more specified low temperatures (i.e., low temperature corners, e.g., at 0° C., −20° C., −55° C. and/or −75° C., etc.) in order to identify any temperature-sensitive circuits within the integrated circuit chip. That is, the timing analysis can be performed by the timing analysis tool 650 to identify circuits that are non-functional or unable to meet or have difficulty meeting performance specifications at the specified low temperature(s).

The mapping tool 660 can be in communication with the timing analysis tool 650 and can generate, based on the results of the timing analysis, a map, which identifies at least one temperature-sensitive zone (TSZ) on an integrated circuit chip. Specifically, referring to FIG. 7, a map 700 of an integrated circuit chip 100 can be divided into multiple zones based on the temperature-sensitivity of the circuits within those zones and, particularly, based on the sensitivity of the circuits within the zones to relatively low ambient temperatures, as determined by the timing analysis tool 650. For example, based on the results of the timing analysis performed by the timing analysis tool 650, the chip 100 can be divided into five discrete zones 151-155. First, second and third zones 151-153 can be designated as temperature-sensitive zones (TSZs). Each TSZ 151, 152, 153 can comprise at least one temperature-sensitive circuit. That is, each TSZ 151, 152, 153 can comprise a circuit that, at a specified low temperature, is known to be non-functional or known to be unable to (i.e., fail to) consistently meet performance specifications (i.e., to known to be unable to consistently meet timing requirements). It should be noted that the specified low temperature may differ between TSZs. For example, TSZ 151 may contain circuits that fail below a first specified temperature (e.g., −55° C.) but are functional and meet timing requirements at higher temperatures, TSZ 152 may contain circuits that fail below a second specified temperature (e.g., −20° C.) but are functional and meet timing requirements at higher temperatures, TSZ 153 may contain circuits that fail below a third specified temperature (e.g., 0° C.) but are functional and meet timing requirements at higher temperatures, etc. Additional zones 154 and 155 can comprise circuits that are functional and capable of consistently meeting performance requirements (i.e., meeting timing requirements) at and above any temperature at issue. The map 700 of FIG. 7 and the description provided above are offered for illustration purposes only and are not intended to be limiting. For example, the overall number of zones and the number of TSZs shown in FIG. 7 and described above are five and three, respectively. However, as mentioned above, this map 700 is generated by the mapping tool 660 based on the results of the timing analysis performed at the specified low temperature(s). Thus, it should be understood that the map 700 can be generated with any number of two or more total zones and any number of one or more TSZs so as to fit the timing analysis results.

The design-for-reliability tool 670 can be in communication with the mapping tool 660 and can, based on the map and a set of DFR rules 675, insert (i.e., be adapted to insert, configured to insert, etc.) at least one thermal radiator into the layout of the integrated circuit chip such that the thermal radiator is in a metal wiring layer and aligned above a TSZ. Specifically, referring to FIGS. 1 and 3, for each TSZ 151, 152, 153, at least one thermal radiator 141, 142, 143, respectively, can be inserted into the layout so as to be positioned within a metal wiring layer 130 and aligned above a corresponding TSZ 151, 152, 153.

For example, two first thermal radiators 141 can be inserted into the layout in a metal wiring layer 130 aligned above the first TSZ 151. Additionally, a single second thermal radiator 142 can be inserted into the layout in a metal wiring layer 130 aligned above the second TSZ 152 and two third thermal radiators 143 can be inserted into the layout in a metal wiring layer 130 aligned above the third TSZ 153. Optionally, one or more conductive vias 140 can also be inserted into the layout such that they extend vertically from any one or more of the thermal radiators in the metal wiring layer towards a corresponding TSZ below. Such conductive vias can drive heat toward the TSZ and, thereby enhance the localized TSZ heating provided by the thermal radiators. For illustration purposes, FIG. 1 shows all of the thermal radiators 141, 142, 143 being positioned in the same metal wiring layer 130. However, it should be understood that these thermal radiators 141, 142, 143 may alternatively be inserted into the layout such that they are positioned in multiple different metal wiring layers (e.g., as a function of space constraints). Furthermore, for illustration purposes, FIGS. 1 and 3, show only one or two thermal radiators within each TSZ. However, it should be understood that the number of thermal radiators inserted into the layout above each TSZ will vary depending upon the area of the TSZ, the size of the thermal radiators, the amount of heat produced by the thermal heaters (i.e., Joules per area energy) and the corresponding heat that reaches the TSZ, etc.

Figure 4:
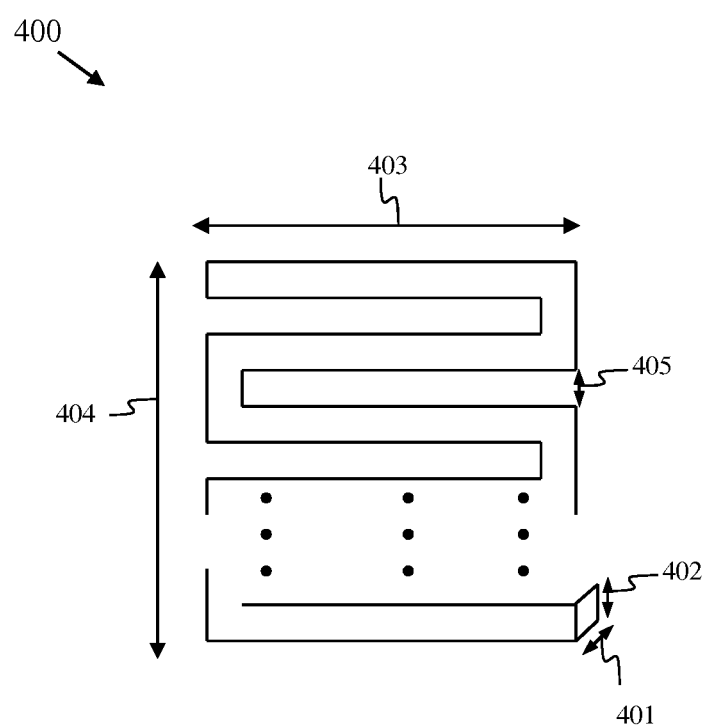
FIG. 4 is a perspective view diagram of an exemplary thermal radiator that can be embedded into the integrated circuit chip of FIG. 1.

One exemplary thermal radiator 400 that can be inserted into the layout is illustrated in FIG. 4 and described in detail above. The thermal radiator 400 is offered for illustration purposes only and is not intended to be limiting. However, any other suitable on-chip thermal radiator structure, which is capable of generating a calculable number of Joules per area of energy in response to an applied voltage and, thereby a calculable thermal load (i.e., heating effect) on the TSZ below, could alternatively be incorporated into the integrated circuit chip 100 of the present invention.

Additionally, referring to FIGS. 1 and 2, for each TSZ 151, 152, 153, the design-for-reliability tool 670 can insert (i.e., be adapted to insert, configured to insert, etc.) at least one temperature sensor 161, 162, 163 into the layout. Specifically, at least one temperature sensor 161, 162, 163 can be inserted into the layout such that it is positioned adjacent to the perimeter of a corresponding TSZ 151, 152, 153, as defined by the map, such that it senses the temperature of that TSZ 151, 152, 153 and such that it is operatively connected to the thermal radiator(s) 141, 142, 143 that are aligned above that TSZ 151, 152, 153 in order to automatically trigger operation of the thermal radiator(s) 141, 142, 143 when the temperature in that TSZ 151, 152, 153 is below a predetermined threshold temperature.

Alternatively, for each TSZ 151, 152, 153, the design-for-reliability tool 670 can insert (i.e., can be adapted to insert, configured to insert, etc.) multiple temperature sensors 161, 162, 163 and a multiplexor 191, 192, 193 into the layout. Specifically, for the first TSZ 151, multiple first temperature sensors 161 can be inserted into the layout so that they are approximately evenly distributed around the perimeter of the first TSZ 151 and so that they sense multiple temperatures around that first TSZ 151. The first multiplexor 191 can be inserted so that it is electrically connected in series between the multiple first temperature sensors 161 and the first thermal radiators 141 in order to ensure that operation of the first thermal radiators 141 is only automatically triggered when a specified number of the temperatures, as sensed by the multiple first temperature sensors 161, are below the predetermined threshold temperature. For the second TSZ 152, multiple second temperature sensors 162 can be inserted into the layout so that they are approximately evenly distributed around the perimeter of the second TSZ 152 and so that they sense multiple temperatures around that TSZ 152. The second multiplexor 192 can be inserted so that it is electrically connected in series between the multiple second temperature sensors 162 and the second thermal radiator 142 in order to ensure that operation of the second thermal radiators 142 is only automatically triggered when a specified number of the temperatures, as sensed by the multiple second temperature sensors 162, are below the predetermined threshold temperature. Similarly, for the third TSZ 153, multiple third temperature sensors 163 can be inserted into the layout so that they are approximately evenly distributed around the perimeter of the third TSZ 153 and so that they sense multiple temperatures around that third TSZ 153. The third multiplexor 193 can be inserted so that it is electrically connected in series between the multiple third temperature sensors 163 and the third thermal radiator 143 in order to ensure that operation of the third thermal radiators 143 is only automatically triggered when a specified number of the temperatures, as sensed by the multiple third temperature sensors 163, are below the predetermined threshold temperature.

More specifically, for each TSV 151-153, the design-for reliability tool 670 can insert multiple temperature sensors, multiple corresponding sense amplifiers, a multiplexor and one or more thermal radiators into the layout, as illustrated in FIG. 5 and discussed in detail above. In this case, each sense amplifier can receive inputs signals from a temperature sensor and a reference signal source so that its output signal is indicative of whether or not the temperature sensed by that temperature sensor is below a predetermined threshold voltage. The multiplexor can receive output signals from all of the sense amplifiers receiving signals from temperature sensors around a particular TSZ and can output (i.e., can be configured to output, adapted to output, etc.) a signal to the thermal radiators aligned above that TSZ so as to automatically trigger operation of those thermal radiators when the temperature, as sensed by a specified number of the temperature sensors (e.g., all the first temperatures sensors, half the first temperature sensors, any one of the first temperature sensors, etc.), is a below the predetermined threshold temperature.

It should be noted that the predetermined threshold temperature for the each TSZ 151, 152, 153 may be the same predetermined temperature threshold (e.g., 0° C., −20° C., −55° C., −75° C., etc.). Alternatively, the predetermined threshold temperatures for the different TSZs may be different so as to correspond to different specified low temperatures used in establishing the TSZs. For example, the predetermined threshold temperature for a given TSZ may be equal to or slightly lower than (e.g., within a few degrees of) the specified low temperature used to establish that TSZ. It should further be understood that any of multiple different types of temperature sensors can be inserted into the layout. Temperature sensors are well-known in the art and, thus, the details such sensors are omitted from this specification in order to allow the reader to focus on the salient aspects of the invention.

Optionally, if the initial design for the integrated circuit chip 100 comprises an on-chip power control system 190 (i.e., a power bussing system) (see FIG. 5) to selectively control powering up and down of different circuits within the chip, the design-for-reliability tool 670 can further operatively connect each multiplexor 191, 192, 193 associated with each TSZ 151, 152, 153 to that power control system 190 such that the operation of the corresponding thermal radiators 141, 142, 143 is further only automatically triggered immediately prior to powering up of any circuit that is within the corresponding TSZ 151, 152, 153. That is, design-for-reliability tool 670 can electrically connect the power control system 190 to each multiplexor 191, 192, 193, can configure the power control system 190 to selectively output enable signals to these multiplexors 191, 192, 193 just prior to (e.g., within a second of, within a half-second of, etc.) powering up circuits within the corresponding TSZs 151, 152, 153 and can configure each multiplexor 191, 192, 193 to only output an output signal to the corresponding thermal radiator(s) 141, 142, 143 upon receipt of an enable signal from the power control system 190, thereby ensuring that the thermal radiators are only operated when it is necessary.

Optionally, prior to insertion of thermal radiators and temperature sensors into the layout by the design-for-reliability tool 670, the map generated by the mapping tool 660 can be accessed by the placement tool 630. The placement tool 630 can then regenerate (i.e., be adapted to regenerate, configured to regenerate, etc.) the layout such that the temperature-sensitive circuits identified during the timing analysis are co-located on the integrated circuit chip 100 (i.e., are within close proximity of each other on the chip). Then, routing, timing analysis, and mapping processes can be repeated by the routing tool 840, timing analysis tool 850 and mapping tool 660, respectively. By iteratively performing these processes, the total number of TSZs can be limited and, thereby the number of thermal radiators, temperature sensors, etc. Thus, the chip area consumed is minimized.

Finally, the system 600 can comprise a compiling tool 680 that can compile (i.e., can be adapted to compile, configured to compile, etc.) the results from the placement tool 630, routing tool 640, timing analysis tool 650, and DFR tool 670 as well as the results of any other design tool used in order to generate, store (e.g., in the data storage device 601) and, optionally, output (e.g., to tape-out, to manufacturing, to a mask house, to another design house, to a customer, etc.) a final design structure 685.

It should be noted that system 600 may be implemented in the form of hardware or a combination of hardware and software. Furthermore, while the system 600 is shown in FIG.

6 as having a number of discrete computing components (e.g., logic simulator 610, synthesis tool 620, placement tool 630, routing tool 640, timing analysis tool 650, mapping tool 660, DFR tool 670, and compiling tool 680), any two or more of these components may be combined into a single component (e.g., a single computer) and any one of these components may be divided into two or more components. It should further be noted that synthesis tools, placement tools, routing tools, timing analysis tools, mapping tools, and compiling tools are well-known in the art. Thus, the details are omitted from the specification in order to allow the reader to focus on the salient aspects of the invention. Tools that design for a specific goal (e.g., manufacturability and testability) based a set of design rules are also well-known in the art and the DFR tool 670 of the present invention can be implemented in essentially the same manner.

Figure 8:
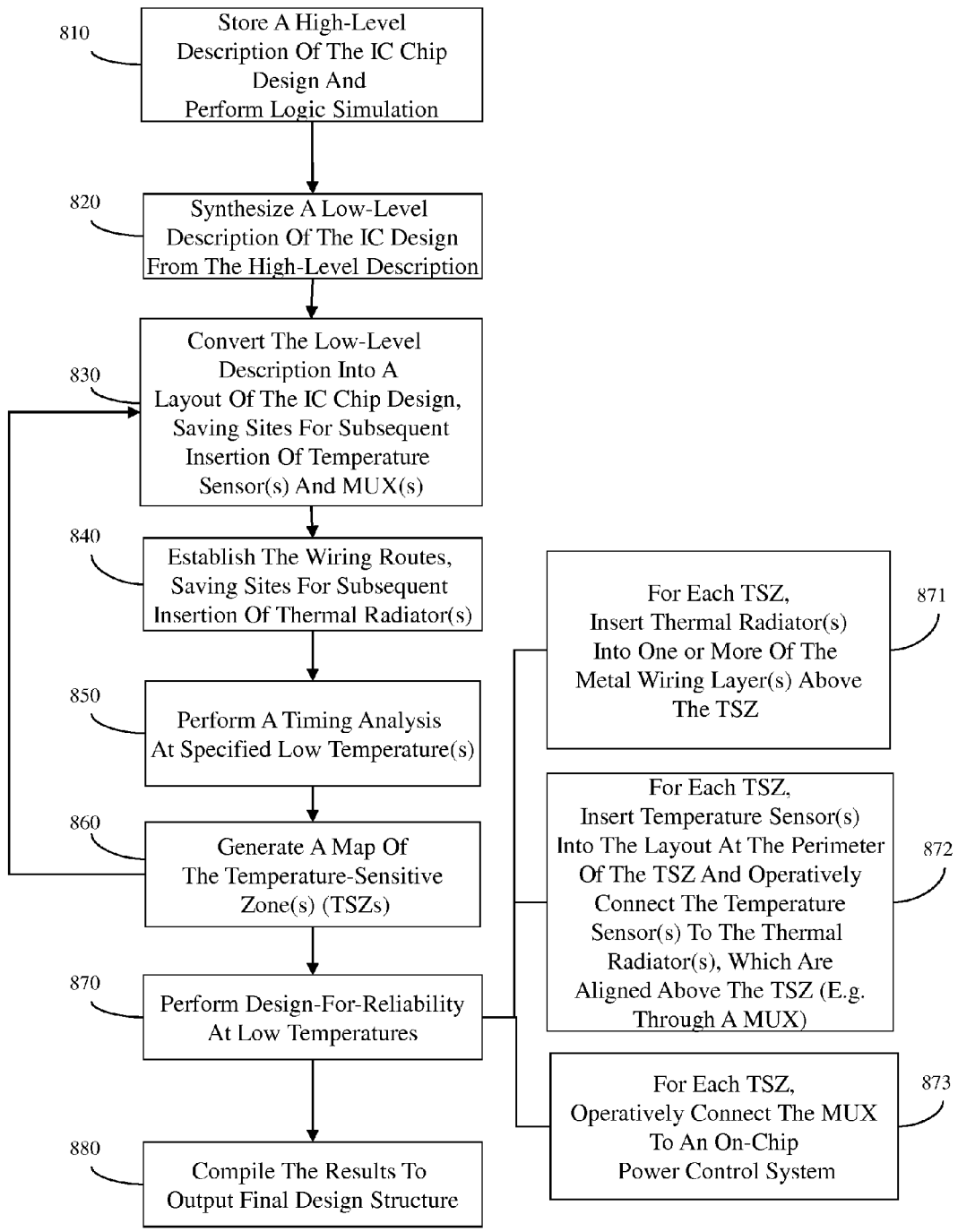
FIG. 8 is a flow diagram illustrating an embodiment of a method for designing an integrated circuit chip with embedded thermal radiators for reliability at low ambient temperatures.

Referring to FIG. 8 in combination with FIG. 6, also disclosed herein are embodiments of a computer-implemented method for designing an integrated circuit chip, as described above and illustrated in FIGS. 1-3. Specifically, the method can comprise storing an initial design 615 for the integrated circuit chip 100 (e.g., in a data storage device 601 of a computer system 600) (810). This initial design 615 can comprise a high-level description, which sets out the requirements for the integrated circuit chip in a hardware description language (HDL) (e.g., VHDL or Verilog).

The method can further comprise simulating the high-level description in order to verify the design logic (e.g., by a logic simulator 610 of the computer system 600) and, then, synthesizing a low-level description (e.g., a netlist) for the integrated circuit chip from the high-level description (e.g., by a logic synthesis tool 620 of the computer system 600) (820).

Next, the low-level description of the integrated circuit chip can be converted into a layout for the integrated circuit chip (830). Specifically, this process can be performed (e.g., by a placement tool 630 of a computer system 600) so as to establish placement of devices on the chip or, more particularly, placement of groups of interconnected devices (i.e., cells or blocks) as set forth in the second-level description. Layout versus schematic (LVS) checking techniques can be used to associate specific polygons in the layout with the untested and tested nodes and can tag them accordingly in the layout (e.g., with a special code).

After the low-level description has been converted into a layout at process 830, a detailed routing for the integrated circuit chip can be establish based on that layout (840). Specifically, this process can be performed (e.g., by a routing tool 640 of a computer system 600) so as to establish wiring routes in the metal wiring layers for interconnecting the circuits on the chip and for interconnecting devices within the circuits. It should be noted that these process 830 and 840 should be performed so as to leave space in the semiconductor substrate and the metal wiring layers for subsequent insertion at process 870 of temperature sensors and thermal radiators, respectively, as discussed in greater detail below.

Next, a timing analysis can be performed (e.g., by a timing analysis tool 650 of a computer system 600) (850). Specifically, this timing analysis can be performed based on the initial design 615 and, more particularly, based on the layout and wiring routing for the initial design 615, as generated at processes 830 and 840, respectively. This timing analysis can further be at one or more specified low temperatures (i.e., low temperature corners, e.g., 0° C., –20° C., –55° C., and/or –75° C., etc.) in order to identify any temperature-sensitive circuits within the integrated circuit chip. That is, the timing analysis can be performed to identify circuits that are non-functional or unable to meet or have difficulty meeting performance specifications at the specified low temperature(s).

Figure 7:
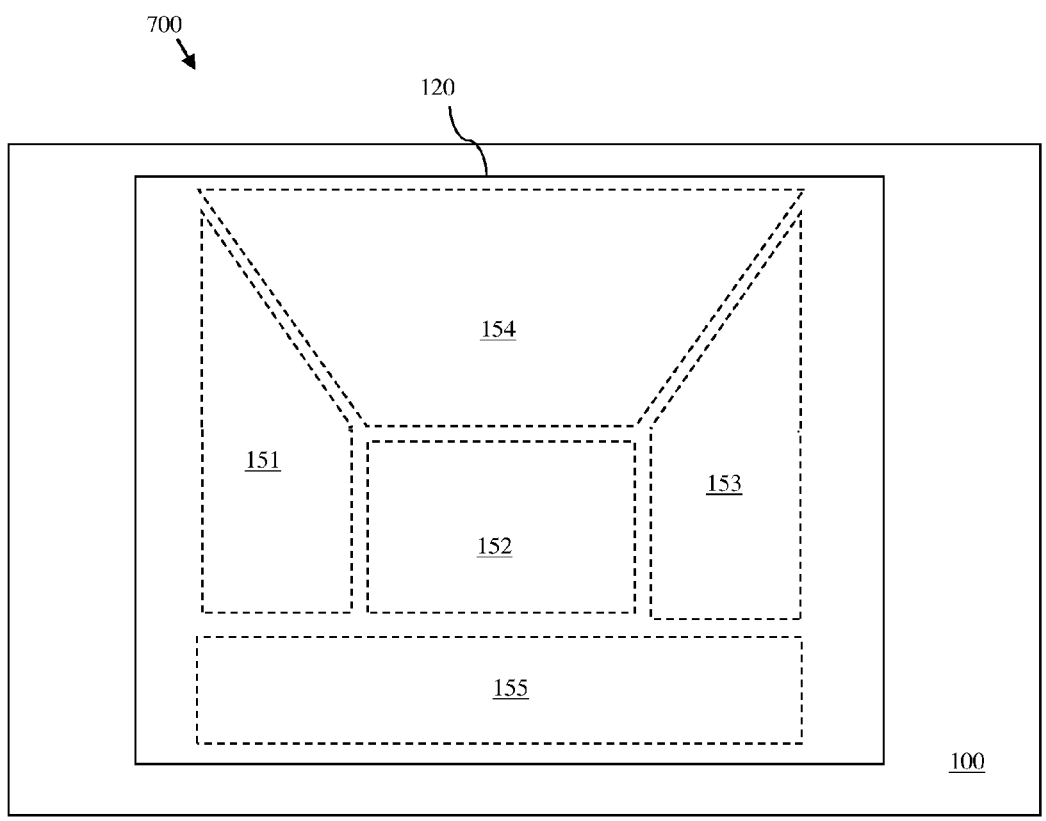
FIG. 7 illustrates an exemplary map that can be generated by a map generation tool of the design system of FIG. 6.

After the timing analysis is performed at process 850, a map can be generated based on the results of the timing analysis (860). Specifically, this map can be generated (e.g., by a mapping tool 660 of the computer system 600) in order to identify at least one temperature-sensitive zone (TSZ) on an integrated circuit chip. Referring to FIG. 7, the map 700 can be divided into multiple zones based on the temperature-sensitivity of the circuits within those zones and, particularly, based on the sensitivity of the circuits within the zones to relatively low ambient temperatures, as determined by timing analysis at process 850. For example, based on the results of the timing analysis, the chip 100 can be divided into five discrete zones 151-155. First, second and third zones 151-153 can be designated as temperature-sensitive zones (TSZs). Each TSZ 151, 152, 153 can comprise at least one temperature-sensitive circuit. That is, each TSZ 151, 152, 153 can comprise a circuit that, at a specified low temperature, is known to be non-functional or known to be unable to (i.e., fail to) consistently meet performance specifications (i.e., to known to be unable to consistently meet timing requirements). It should be noted that the specified low temperature may differ between TSZs. For example, TSZ 151 may contain circuits that fail below a first specified temperature (e.g., –55° C.) but are functional and meet timing requirements at higher temperatures, TSZ 152 may contain circuits that fail below a second predetermined temperature (e.g., –20° C.) but are functional and meet timing requirements at higher temperatures, TSZ 153 may contain circuits that fail below a third predetermined temperature (e.g., 0° C.) but are functional and meet timing requirements at higher temperatures, etc. Additional zones 154 and 155 can comprise circuits that are functional and capable of consistently meeting performance requirements (i.e., meeting timing requirements) at and above any temperature at issue. The map 700 of FIG. 7 and the description provided above are offered for illustration purposes only and are not intended to be limiting. For example, the overall number of zones and the number of TSZs shown in FIG. 7 and described above are five and three, respectively. However, as mentioned above, this map 700 is generated by the mapping tool 660 based on the results of the timing analysis performed at the specified low temperature(s). Thus, it should be understood that the map 700 can be generated with any number of two or more total zones and any number of one or more TSZs so as to fit the timing analysis results.

Following generation of the map at process 860, design-for-reliability processes can be performed (870). These design-for-reliability processes 870 can be performed (e.g., by a design-for-reliability tool 670 of the computer system 600) based on the map generated at process 860 as well as on a set of design-for-reliability rules 675 (e.g., stored in the data storage device 601 of the computer system 600). Specifically, at least one thermal radiator can be inserted into the layout of the integrated circuit chip such that the thermal radiator is in a metal wiring layer and aligned above a TSZ (871). Referring to FIGS. 1 and 3, for each TSZ 151, 152, 153, at least one thermal radiator 141, 142, 143, respectively, can be inserted into the layout so as to be positioned within a metal wiring layer 130 and aligned above a corresponding TSZ 151, 152, 153.

For example, two first thermal radiators 141 can be inserted into the layout in a metal wiring layer 130 aligned above the first TSZ 151. Additionally, a single second thermal radiator 142 can be inserted into the layout in a metal wiring layer 130 aligned above the second TSZ 152 and two third thermal radiators 143 can be inserted into the layout in a metal wiring layer 130 aligned above the third TSZ 153. Optionally, one or more conductive vias 140 can also be inserted into the layout such that they extend vertically from any one or more of the thermal radiators in the metal wiring layer towards a corresponding TSZ below. Such conductive vias can enhance the localized TSZ heating provided by the thermal radiators. For illustration purposes, FIG. 1 shows all of the thermal radiators 141, 142, 143 being positioned in the same metal wiring layer 130. However, it should be understood that these thermal radiators 141, 142, 143 may alternatively be inserted into the layout such that they are positioned in multiple different metal wiring layers (e.g., as a function of space constraints). Furthermore, for illustration purposes, FIGS. 1 and 3, show only one or two thermal radiators within each TSZ. However, it should be understood that the number of thermal radiators inserted into the layout above each TSZ will vary depending upon the area of the TSZ, the size of the thermal radiators, the amount of heat produced by the thermal heaters (i.e., Joules per area of energy) and the corresponding heat that reaches the TSZ, etc.

One exemplary thermal radiator 400 that can be inserted into the layout at process 871 is illustrated in FIG. 4 and described in detail above. The thermal radiator 400 is offered for illustration purposes only and is not intended to be limiting. Any other suitable on-chip thermal radiator structure, which is capable of generating a calculable number of Joules per area of energy in response to an applied voltage and, thereby a calculable thermal load (i.e., heating effect) on the TSZ below, could alternatively be incorporated into the integrated circuit chip 100 of the present invention.

Additionally, at least one temperature sensor 161, 162, 163 can be inserted into the layout such that it is positioned adjacent to the perimeter of a corresponding TSZ 151, 152, 153, as defined by the map, such that it senses the temperature of that TSZ 151, 152, 153 and such that it is operatively connected to the thermal radiator(s) 141, 142, 143 that are aligned above that TSZ 151, 152, 153 in order to automatically trigger operation of the thermal radiator(s) 141, 142, 143 when the temperature in that TSZ 151, 152, 153 is below a predetermined threshold temperature (872, see FIGS. 1-2).

Alternatively, at process at process 872, for each TSZ 151, 152, 153, multiple temperature sensors 161, 162, 163 and a multiplexor 191, 192, 193 can be inserted into the layout (e.g., by the design-for-reliability tool 670). Specifically, for the first TSZ 151, multiple first temperature sensors 161 can be inserted into the layout so that they are approximately evenly distributed around the perimeter of the first TSZ 151 and so that they sense multiple temperatures around that first TSZ 151. The first multiplexor 191 can be inserted so that it is electrically connected in series between the multiple first temperature sensors 161 and the first thermal radiators 141 in order to ensure that operation of the first thermal radiators 141 is only automatically triggered when a specified number of the temperatures, as sensed by the multiple first temperature sensors 161, are below the predetermined threshold temperature. For the second TSZ 152, multiple second temperature sensors 162 can be inserted into the layout so that they are approximately evenly distributed around the perimeter of the second TSZ 152 and so that they sense multiple temperatures around that TSZ 152. The second multiplexor 192 can be inserted so that it is electrically connected in series between the multiple second temperature sensors 162 and the second thermal radiator 142 in order to ensure that operation of the second thermal radiators 142 is only automatically triggered when a specified number of the temperatures, as sensed by the multiple second temperature sensors 162, are below the predetermined threshold temperature. Similarly, for the third TSZ 153, multiple third temperature sensors 163 can be inserted into the layout so that they are approximately evenly distributed around the perimeter of the third TSZ 153 and so that they sense multiple temperatures around that third TSZ 153. The third multiplexor 193 can be inserted so that it is electrically connected in series between the multiple third temperature sensors 163 and the third thermal radiator 143 in order to ensure that operation of the third thermal radiators 143 is only automatically triggered when a specified number of the temperatures, as sensed by the multiple third temperature sensors 163, are below the predetermined threshold temperature.

More specifically, for each TSV 151-153, multiple temperature sensors, multiple corresponding sense amplifiers, a multiplexor and one or more thermal radiators can be inserted into the layout, as illustrated in FIG. 5 and discussed in detail above. In this case, each sense amplifier can receive inputs signals from a temperature sensor and a reference signal source so that its output signal is indicative of whether or not the temperature sensed by that temperature sensor is below a predetermined threshold voltage. The multiplexor can receive output signals from all of the sense amplifiers receiving signals from temperature sensors around a particular TSZ and can send (i.e., can be configured to send or transmit, adapted to send or transmit, etc.) a signal to the thermal radiators aligned above that TSZ so as to automatically trigger operation of those thermal radiators when the temperature, as sensed by a specified number of the temperature sensors (e.g., all the first temperatures sensors, half the first temperature sensors, any one of the first temperature sensors, etc.), is a below the predetermined threshold temperature.

It should be noted that the predetermined threshold temperature for the each TSZ 151, 152, 153 may be the same predetermined temperature threshold (e.g., 0° C., −20° C., −55° C., −75° C., etc.). Alternatively, the predetermined threshold temperatures for the different TSZs may be different so as to correspond to different specified low temperatures used in establishing the TSZs. For example, the predetermined threshold temperature for a given TSZ may be equal to or slightly lower than (e.g., within a few degrees of) the specified low temperature used to establish that TSZ. It should further be understood that any of multiple different types of temperature sensors can be inserted into the layout. Temperature sensors are well-known in the art and, thus, the details such sensors are omitted from this specification in order to allow the reader to focus on the salient aspects of the invention.

Optionally, if the initial design for the integrated circuit chip 100 comprises an on-chip power control system 190 (i.e., a power bussing system) (see FIG. 5) to selectively control powering up and down of different circuits within the chip, the design-for-reliability process 870 can further comprise operatively connecting each multiplexor 191, 192, 193 associated with each TSZ 151, 152, 153 to that power control system 190 such that the operation of the corresponding thermal radiators 141, 142, 143 is further only automatically triggered immediately prior to powering up of any circuit that is within the corresponding TSZ 151, 152, 153. That is, design-for-reliability process 870 can further comprise electrically connecting the power control system 190 to each multiplexor 191, 192, 193, configuring the power control system 190 to selectively output enable signals to these multiplexors 191, 192, 193 just prior to (e.g., within a second of, within a half-second of, etc.) powering up circuits within the corresponding TSZs 151, 152, 153 and configuring each multiplexor 191, 192, 193 to only output an output signal to the corresponding thermal radiator(s) 141, 142, 143 upon receipt of an enable signal from the power control system 190, thereby ensuring that the thermal radiators are only operated when it is necessary.

Optionally, prior to performing design-for-reliability at process 870, processes 830-860 can be repeated. Specifically, the layout can be regenerated at process 830 based on the map so that the temperature-sensitive circuits identified during the timing analysis are co-located on the integrated circuit chip 100 (i.e., are within close proximity of each other on the chip). Then, routing 840, timing analysis 850, and mapping 860 can be repeated. By iteratively performing these processes, the total number of TSZs can be limited and, thereby the number of thermal radiators, temperature sensors, etc. Thus, the chip area consumed is minimized.

Finally, the method embodiments can comprise compiling (e.g., by a compiling tool 680 of the computer system 600) the results from the placement process 830, the routing process 840, the timing analysis process 850 and the DFR process 670 as well as any results of any other additional design processes performed in order to generate, store (e.g., in the data storage device 601) and, optionally, output (e.g., to tape-out, to manufacturing, to a mask house, to another design house, to a customer, etc.) a final design structure 685.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable non-transitory storage medium (e.g., a data storage device). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium (e.g., a computer readable signal medium or a computer readable non-transitory storage medium, such as a data storage device).) that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
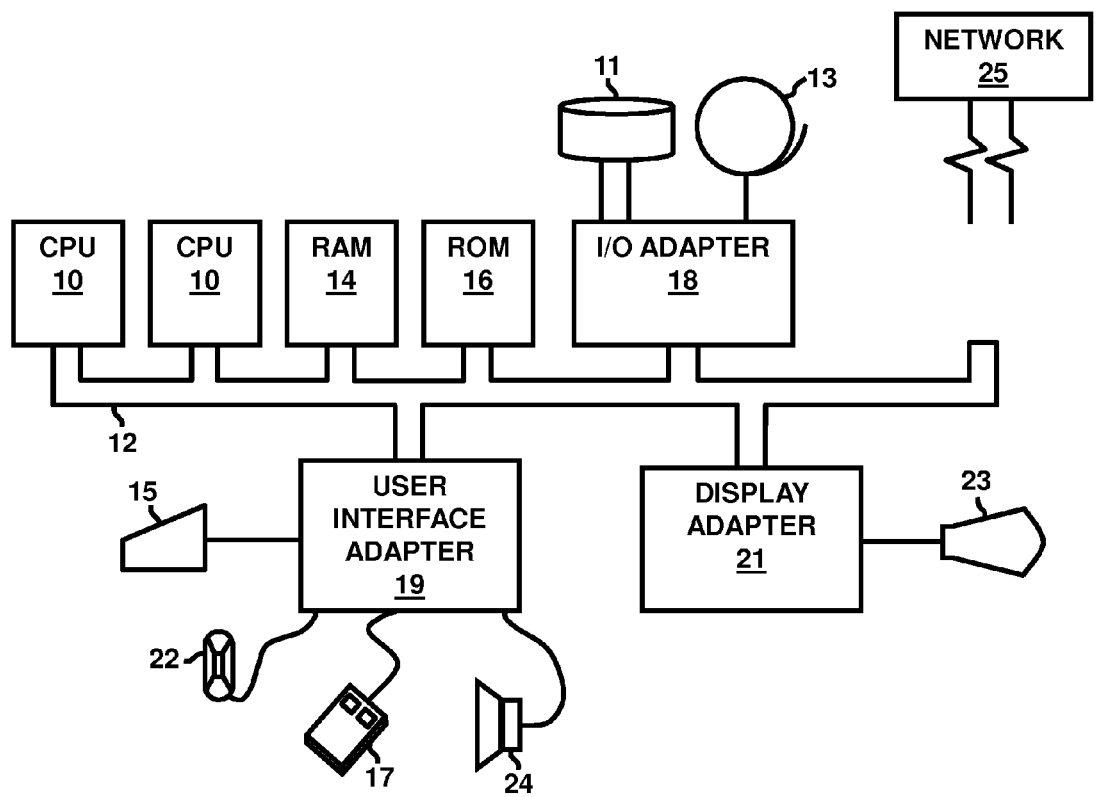
FIG. 9 is a schematic diagram illustrating an exemplary hardware environment that can be used to implement the system and method embodiments.

A representative hardware environment for practicing the embodiments of the invention is depicted in FIG. 9. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures described above illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood that the terminology used herein is for the purpose of describing particular embodiments only and is not intended to be limiting of the invention. As used herein, the singular forms "a", "an" and "the" are intended to include the plural forms as well, unless the context clearly indicates otherwise. It should further be understood that the terms "comprises", "comprising", "includes", and/or "including", when used in this specification, specify the presence of stated features, integers, steps, operations, elements, and/or components, but do not preclude the presence or addition of one or more other features, integers, steps, operations, elements, components, and/or groups thereof. Additionally, it should be understood that the corresponding structures, materials, acts, and equivalents of all means or step plus function elements in the claims below are intended to include any structure, material, or act for performing the function in combination with other claimed elements as specifically claimed. The description of the embodiments of the present invention has been presented for purposes of illustration and description, but is not intended to be exhaustive or limited to the invention in the form disclosed. Many modifications and variations to the embodiments will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Therefore, disclosed above are embodiments of an integrated circuit chip designed for reliability at low ambient temperatures. Specifically, the semiconductor substrate of the integrated circuit chip can be divided into zones, including at least one temperature-sensitive zone (TSZ) that comprises one or more temperature-sensitive circuits (i.e., circuits that, at a specified low temperature, are known to be non-functional or known to be unable to meet performance specifications). Temperature sensor(s) can be positioned in the semiconductor substrate adjacent to the TSZ. Thermal radiator(s) can be embedded in a metal wiring layer and aligned above the TSZ. The temperature sensor(s) can be operatively connected to the thermal radiator(s) in order to trigger operation of the thermal radiator(s) when the temperature in the TSZ is below a predetermined threshold temperature. Additionally, an on-chip power control system can be operatively connected to the thermal radiator(s) so that operation of the thermal radiator(s) is only triggered when a circuit within the TSZ is about to be powered up. Also disclosed herein are associated embodiments of a system and method for designing such an integrated circuit chip. The embodiments allow integrated circuit chips and the various circuit contained therein to operate in low temperature environments even with the initial design for the chip was not intended meet those conditions.

What is claimed is:

1. A system for designing an integrated circuit chip, said system comprising:
   a timing analysis tool performing a timing analysis of said integrated circuit chip at a specified low temperature to identify any temperature-sensitive circuits within said integrated circuit chip, said timing analysis being performed based on an initial design for said integrated circuit chip;
   a mapping tool in communication with said timing analysis tool and generating a map that identifies at least one temperature-sensitive zone on said integrated circuit chip, said temperature-sensitive zone comprising at least one temperature-sensitive circuit and said map being generated based on results of said timing analysis; and
   a design-for-reliability tool in communication with said mapping tool and inserting, based on said map, at least one thermal radiator into a layout of said integrated circuit chip such that said thermal radiator is in a metal wiring layer and aligned above said temperature-sensitive zone,
   said design-for-reliability tool further inserting, based on said map, at least one temperature sensor into said layout such that said temperature sensor is positioned adjacent to a perimeter of said temperature-sensitive zone, senses a temperature of said temperature-sensitive zone and is operatively connected to said thermal radiator so as to automatically trigger operation of said thermal radiator when said temperature is a below a predetermined threshold temperature.

2. The system of claim 1, further comprising,
   a data storage device storing said initial design of said integrated circuit chip;
   a placement tool converting said initial design into said layout; and
   a routing tool establishing, based on said layout, wiring routes for said integrated circuit chip in metal wiring layers,
   said placement tool and said routing tool leaving space in a semiconductor substrate of said integrated circuit chip and said metal wiring layers for insertion of temperature sensors and thermal radiators, respectively.

3. The system of claim 1,
   said design-for-reliability tool further inserting multiple temperature sensors and a multiplexor into said layout,
      said multiple temperature sensors being approximately evenly distributed around said perimeter and sensing multiple temperatures around said temperature-sensitive zone, and said multiplexor being electrically connected between said multiple temperature sensors and said thermal radiator and ensuring that said operation of said thermal radiator is only automatically triggered when a specified number of said temperatures are below said predetermined threshold temperature.

4. The system of claim 3, said integrated circuit chip comprising a power control system that selectively controls powering up and down of different circuits on said integrated circuit chip and said multiplexor being operatively controlled by said power control system such that said operation of said thermal radiator is only triggered immediately prior to powering up of any circuit that is within said temperature-sensitive zone.

5. The system of claim 1, said temperature-sensitive circuits comprising any circuit that, during said timing analysis, is non-functioning at said specified low temperature.

6. The system of claim 1, said temperature-sensitive circuits comprising any circuit that, during said timing analysis, fails to meet performance specifications at said specified low temperature.

7. The system of claim 1, said thermal radiator comprising a folded copper wire contained within a predetermined area of said metal wiring layer.

8. A computer-implemented method for designing an integrated circuit chip, said method comprising:
performing, by a computer system and based on an initial design for said integrated circuit chip, a timing analysis of said integrated circuit chip at a specified low temperature to identify any temperature-sensitive circuits within said integrated circuit chip;
generating, by said computer system and based on results of said timing analysis, a map that identifies at least one temperature-sensitive zone on said integrated circuit chip, said temperature-sensitive zone comprising at least one temperature-sensitive circuit;
inserting, by said computer system and based on said map, at least one thermal radiator a layout of said integrated circuit chip such that said thermal radiator is in a metal wiring layer and aligned above said temperature-sensitive zone; and
inserting, by said computer system and based on said map, at least one temperature sensor into said layout such that said temperature sensor is positioned adjacent to a perimeter of said temperature-sensitive zone, senses a temperature of said temperature-sensitive zone and is operatively connected to said thermal radiator so as to automatically trigger operation of said thermal radiator when said temperature is a below a predetermined threshold temperature.

9. The computer-implemented method of claim 8, further comprising, before said performing of said timing analysis,
storing, by a data storage device accessible by said computer system, said initial design of said integrated circuit chip;
converting, by said computer system, said initial design into said layout for said integrated circuit chip; and
establishing, by said computer system and based on said layout, wiring routes in metal wiring layers for said integrated circuit chip,
said converting and said establishing being performed so that space remains available in a semiconductor substrate of said integrated circuit chip and said metal wiring layers for insertion of temperature sensors and thermal radiators, respectively.

10. The computer-implemented method of claim 8,
said inserting further comprising inserting multiple temperature sensors and a multiplexor into said layout,
said multiple temperature sensors being approximately evenly distributed around said perimeter and sensing multiple temperatures around said temperature-sensitive zone, and
said multiplexor being electrically connected between said multiple temperature sensors and said thermal radiator and ensuring that said operation of said thermal radiator is only automatically triggered when a specified number of said temperatures are below said predetermined threshold temperature.

11. The computer-implemented method of claim 10, said integrated circuit chip comprising a power control system that selectively controls powering up and down of different circuits on said integrated circuit chip and said multiplexor being operatively controlled by said power control system such that said operation of said thermal radiator is only triggered immediately prior to powering up of any circuit that is within said temperature-sensitive zone.

12. The computer-implemented method of claim 8, said temperature-sensitive circuits comprising any circuit that, during said timing analysis, is non-functioning at said specified low temperature.

13. The computer-implemented method of claim 8, said temperature-sensitive circuits comprising any circuit that, during said timing analysis, fails to meet performance specifications at said specified low temperature.

14. The computer-implemented method of claim 8, said thermal radiator comprising a folded copper wire contained within a predetermined area of said metal wiring layer.

* * * * *